(12) United States Patent
Tresserras Picas et al.

(10) Patent No.: US 9,010,703 B2
(45) Date of Patent: Apr. 21, 2015

(54) KIT FOR MOUNTING ONE OR MORE APPLIANCES ON A POLE

(75) Inventors: Jose Tresserras Picas, Palma de Mallorca (ES); Javier Viñas Garcia De Falces, Terrassa (ES); Antonio Fargas Angrill, Artés (ES)

(73) Assignee: Acronimus Technology, S.L., Artes (Barcelona) (ES)

( * ) Notice: Subject to any disclaimer, the term of this patent is extended or adjusted under 35 U.S.C. 154(b) by 0 days.

(21) Appl. No.: 13/818,836

(22) PCT Filed: Aug. 26, 2010

(86) PCT No.: PCT/EP2010/062465
§ 371 (c)(1),
(2), (4) Date: Mar. 20, 2013

(87) PCT Pub. No.: WO2012/025153
PCT Pub. Date: Mar. 1, 2012

(65) Prior Publication Data
US 2013/0167367 A1 Jul. 4, 2013

(51) Int. Cl.
A47G 29/00 (2006.01)
A47B 45/00 (2006.01)
(Continued)

(52) U.S. Cl.
CPC ............... B23P 19/04 (2013.01); E04H 12/24 (2013.01); F21W 2111/02 (2013.01)

(58) Field of Classification Search
CPC ...... F16M 13/02; E04G 5/067; F21V 21/116; F21V 21/088; F21V 21/0885; F21W 2111/00; F21W 2111/02; F21W 2111/023; F21S 8/08; F21S 8/085; F21S 8/086

USPC .......................... 248/534, 535, 230.2, 230.1, 248/218.4–219.4, 227.3, 411–412, 414, 248/226.12, 224.7; 362/431, 368, 370; 211/205, 196; 108/147.11–147.12, 108/147.18–147.19, 148, 106–109; 403/314
See application file for complete search history.

(56) References Cited

U.S. PATENT DOCUMENTS 855,138 A * 5/1907 Sciple ........................ 52/651.02
2,066,419 A * 1/1937 Pfistershammer .............. 52/843
(Continued)

FOREIGN PATENT DOCUMENTS

BE 856513 A1 10/1977
DE 481315 C 8/1929
(Continued)

OTHER PUBLICATIONS

International Search Report (ISR), International Application No. PCT/EP2013/051057, International Filing Date Jan. 21, 2013, Date of Mailing ISR Oct. 1, 2013, 10 pages, European Patent Office, Rijswijk Netherlands.
(Continued)

Primary Examiner — Christopher Garft
(74) Attorney, Agent, or Firm — Peter B. Scull; Hamilton, DeSanctis & Cha LLP

(57) ABSTRACT

A kit for mounting one or more appliances on a pole, the kit comprising a central ring for being mounted around a pole and having a through-hole, a fitting surface and a support surface, and a carrier having a base part and at least one support arm extending from said base part for supporting one or more appliances, wherein said base part is adapted to be fitted on said support surface and has a through-hole adapted for being fitted around said fitting surface.

16 Claims, 13 Drawing Sheets

(51) Int. Cl.
 *A47B 9/00* (2006.01)
 *B23P 19/04* (2006.01)
 *E04H 12/24* (2006.01)
 *F21W 111/02* (2006.01)

(56) References Cited

U.S. PATENT DOCUMENTS

| | | | | |
|---|---|---|---|---|
| 3,156,418 | A | * | 11/1964 | Jablonski et al. ............... 52/28 |
| 4,489,910 | A | * | 12/1984 | Ferguson ................... 248/219.4 |
| 4,878,160 | A | * | 10/1989 | Reneau et al. ............... 362/269 |
| 5,105,350 | A | * | 4/1992 | Tolman et al. ............... 362/431 |
| 5,502,910 | A | | 4/1996 | Lucchesi |
| 5,964,444 | A | * | 10/1999 | Guertler ........................ 248/548 |
| 6,250,596 | B1 | * | 6/2001 | Gordin et al. ............. 248/230.1 |
| 6,575,316 | B2 | * | 6/2003 | Lin ................................ 211/205 |
| 6,685,154 | B1 | * | 2/2004 | Blyth et al. ................... 248/512 |
| 7,137,605 | B1 | * | 11/2006 | Guertler ........................ 248/214 |
| 8,297,563 | B2 | * | 10/2012 | Tsai ........................... 248/125.1 |
| 2008/0054141 | A1 | * | 3/2008 | Koehler ..................... 248/218.4 |
| 2011/0226925 | A1 | * | 9/2011 | Tsai .............................. 248/411 |

FOREIGN PATENT DOCUMENTS

| | | |
|---|---|---|
| EP | 0240054 A1 | 10/1987 |
| GB | 2342753 | 4/2000 |
| WO | WO2012025153 A1 | 3/2012 |

OTHER PUBLICATIONS

International Search Report (ISR), International Application No. PCT/EP2013/051056, International Filing Date Jan. 21, 2013, Date of Mailing ISR Oct. 1, 2013, 11 pages, European Patent Office, Rijswijk Netherlands.

International Search Report and Written Opinion of the International Searching Authority, Search Report, Application No. PCT/EP2010/062465 issued by the European Patent Office, Rijswijk, Netherlands, dated May 20, 2011.

* cited by examiner

KIT FOR MOUNTING ONE OR MORE APPLIANCES ON A POLE

The present invention relates to a kit for mounting one or more appliances on a pole, a carrier to be used in such a kit and to a utility pole.

BACKGROUND ART

Utility poles are commonly used to carry electrical power lines, including distribution lines and subtransmission lines. In urban areas, a variety of utility poles may be used for supporting telephone lines, fibre optic cables, and even traffic lights, street illumination and video cameras. It often happens that, new poles are placed next to existing ones to support a new utility, whenever a utility is installed in a neighbourhood. Chaotic situations may arise wherein different kinds of cables cross over and under each other and a variety of poles exist next to each other.

This kind of situation may have a number of disadvantages: firstly, maintenance work on any of the utilities involved may be complicated, and it may be difficult to install any new utility or other appliance on existing poles or new poles. Secondly, when electrical power lines are placed in the vicinity of other utility cables, electromagnetic interference may occur. Thirdly, the chaos of cables may lead to an unpleasant and chaotic street view.

In order to solve the above-mentioned problems, it is known to use underground power and telephone lines instead of overhead lines. However, depending on the circumstances, an enormous investment may be necessary to replace a significant part of the overhead systems with underground systems. Such an investment may not be viable in all situations, especially in developing and underdeveloped countries.

The present invention is aimed at avoiding or at least partially reducing one or more of the before-mentioned disadvantages related to prior art systems. Further advantages will become apparent from the description that follows.

SUMMARY OF THE INVENTION

In a first aspect, the present invention provides a kit for mounting one or more appliances on a pole, the kit comprising a central ring for being mounted around a pole and having a through-hole, a fitting surface and a support surface, and a carrier having a base part and a support arm extending from said base part for supporting one or more appliances, wherein said base part is adapted to be fitted on said support surface and has a through-hole adapted for being fitted around said fitting surface.

In this aspect, a through-hole of a central ring may be adapted to a particular size and shape of a pole, whereas the carrier may be standardized to be fitted on a central ring. The kit for mounting appliances on a pole is thus versatile.

In some embodiments, the through-hole of the central ring may be adapted to form an interlocking connection with a pole. For example, in some embodiments, a tapering through-hole may be provided for interlocking with a tapering pole. Utility poles may be made of widely varying cross-sections, e.g. circular, square, triangular, hexagonal etc. Typically, poles are manufactured with a tapering cross-section. In this case, the central ring may be mounted on a pole of tapering cross-section by simply sliding the central ring down a pole until they interlock. A secure connection between the pole and a ring with carrier may thus be provided. Optionally, the central ring may comprise one or more lateral holes for fitting a fastener such as e.g. a screw or bolt to further secure a central ring in its position.

In some embodiments, the fitting surface comprises one or more protrusions and the through-hole of the carrier comprises indentations mating said protrusions. This way, the carrier can only be fitted on top of the central ring in one or more predefined relative orientations and assembly of a kit may be facilitated. Optionally, the fitting surface may comprise a plurality of equispaced identical protrusions.

In some embodiments, the carrier may comprise at least two support arms extending from said base part. In some embodiments, a carrier may also comprise three or four or even more support arms.

In some embodiments, the central ring may further comprise a top surface with one or more troughs. The troughs may serve for positioning and guiding cables and wires leading to and from the various utilities and/or other appliances mounted on a pole.

In a further aspect, the invention provides a kit as substantially hereinbefore described, comprising at least two central rings, wherein a first central ring has a first through-hole and a second central ring has a second through-hole of a different size than said first through-hole, and wherein said first central ring and second central ring have corresponding fitting surfaces and support surfaces, such that a carrier can be mounted on either the first central ring or on the second central ring. In this aspect of the invention, a kit is provided wherein several central rings with varying sizes of through-holes can be fitted at different heights on a utility pole (due to the taper of the pole). However, since the support surface and fitting surface are the same, a carrier may be fitted on any of the different heights.

In some embodiments, the support arm may comprise holes for fitting electrical insulators and thus be adapted to carry electrical power lines. In some implementations, a support arm may comprise an illumination system (e.g. street lights) or may carry a traffic light.

In yet another aspect, the invention provides a carrier suitable for being used in a kit substantially as hereinbefore described. And in yet another aspect, the invention provides a utility pole carrying one or more of the kits substantially as hereinbefore described.

BRIEF DESCRIPTION OF THE DRAWINGS

Particular embodiments of the present invention will be described in the following, only by way of non-limiting examples, with reference to the appended drawings, in which.

DETAILED DESCRIPTION OF EMBODIMENTS OF THE INVENTION

Figure 1A:
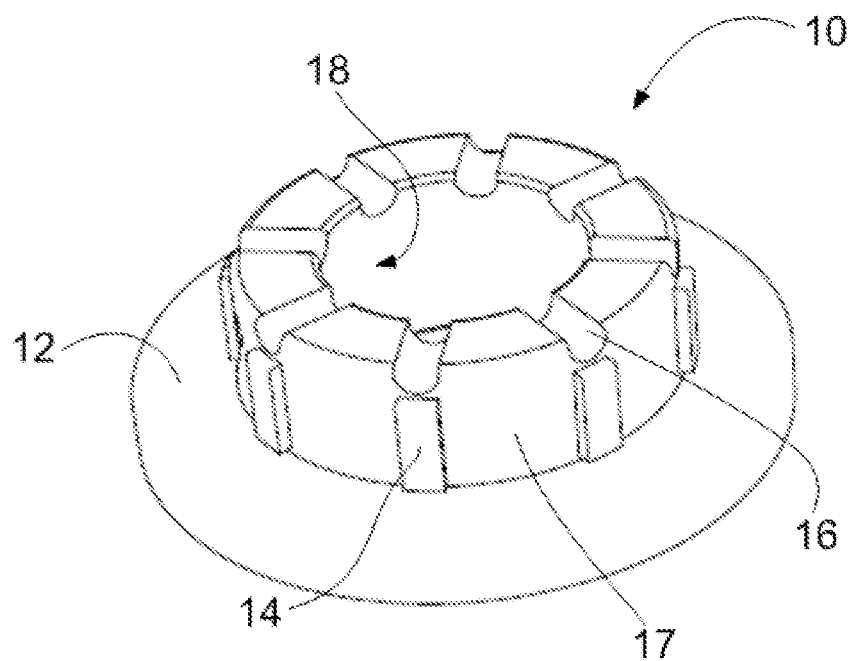
FIGS. 1a-1d illustrate an embodiment of a central ring in accordance with the present invention.
Figure 1B:
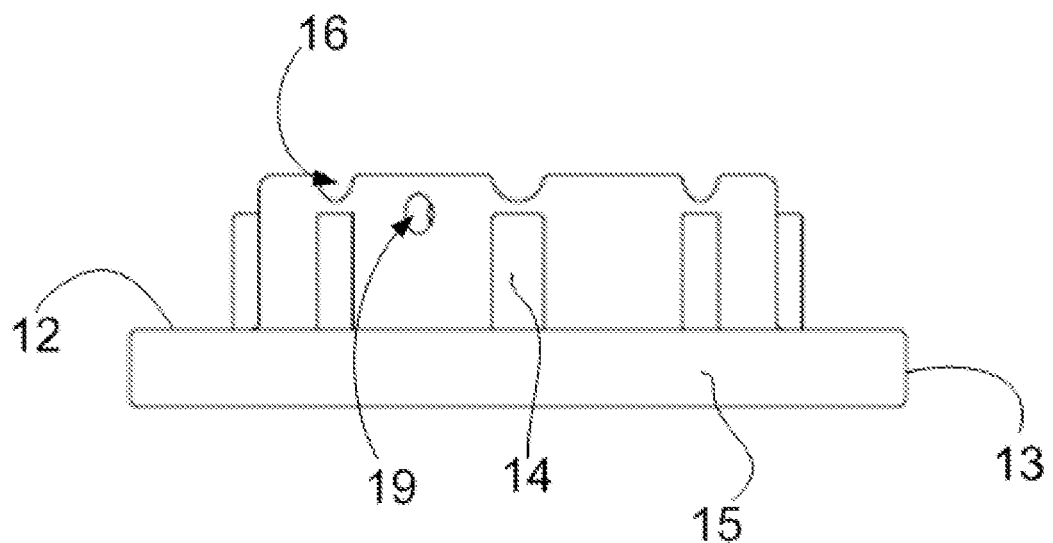
Figure 1C:
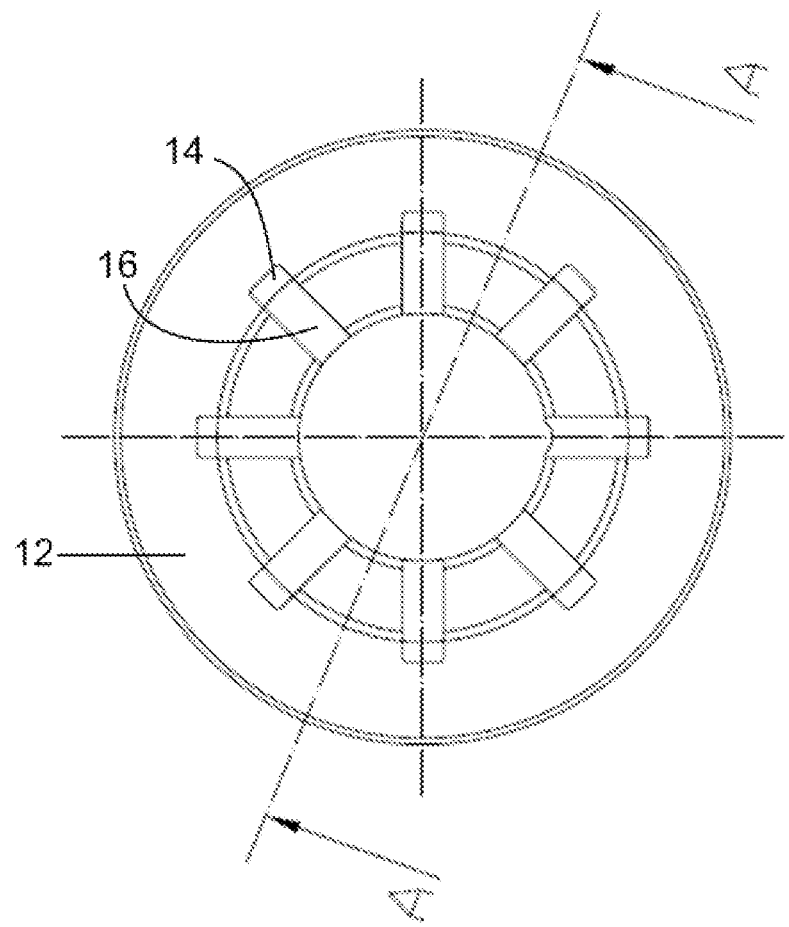
Figure 1D:
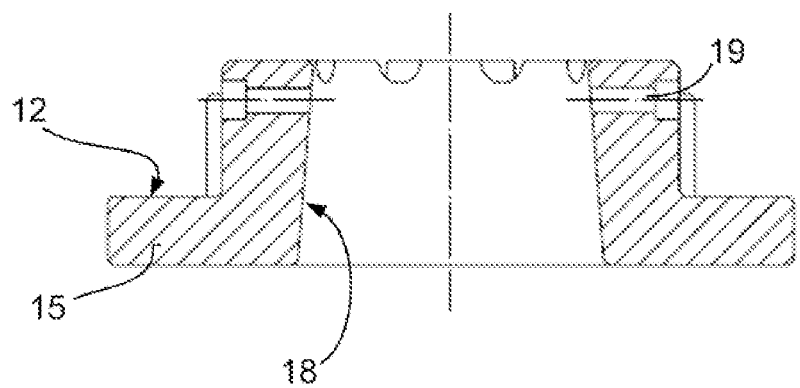

FIGS. 1a-1d illustrate a first embodiment of a central ring according to the present invention. FIG. 1a gives an isometric view, FIG. 1b gives a side view, FIG. 1c gives a top view and FIG. 1d gives a cross-sectional view along the line A-A (illustrated in FIG. 1c).

With reference to FIGS. 1a-1d, a central ring 10 comprising a support surface 12 and a first fitting surface 17 is shown. Central ring 10 further comprises a through-hole with an internal sidewall 18. In this embodiment, central ring 10 further comprises a plurality of equispaced protrusions 14 on first fitting surface 17. Central ring 10 further comprises an annular rim 15 with a second fitting surface 13. Central ring 10 may be provided with lateral holes 19 for fitting a fastener. In this embodiment, troughs 16 are provided in a top surface of central ring 10. The functionalities of the various characteristics of the central ring according to this embodiment will be further explained with reference to FIG. 3 and onwards.

Figure 2A:
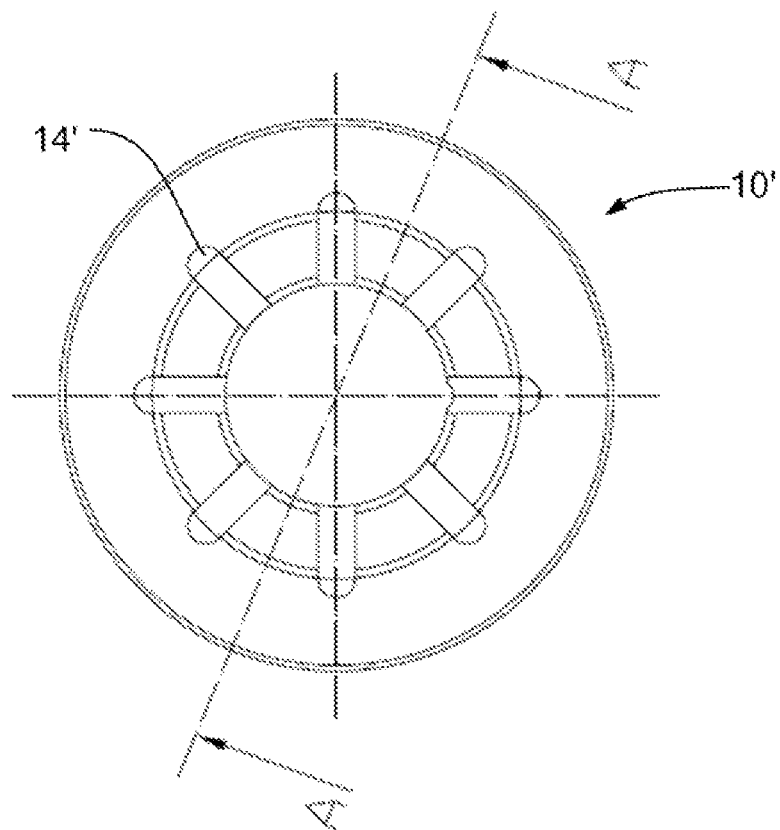
FIGS. 2a-2b illustrate a second embodiment of a central ring in accordance with the present invention.
Figure 2B:
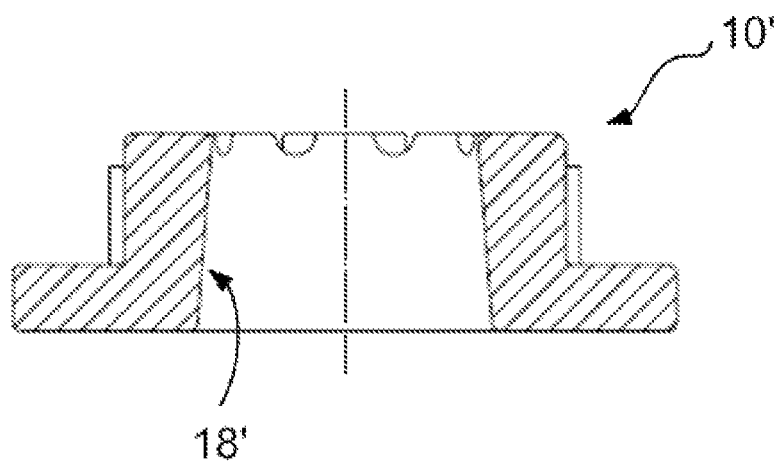

FIGS. 2a-2b illustrate an alternative embodiment of a central ring 10'. Central ring 10' largely corresponds to central ring 10, but does not comprise the fastener holes 19 at the fitting surface. Additionally, the shape of protrusions 14' is more rounded and they have a semi-circular cross-section, whereas the protrusions 14 of central ring 10 had a rectangular cross-section.

Figure 3A:
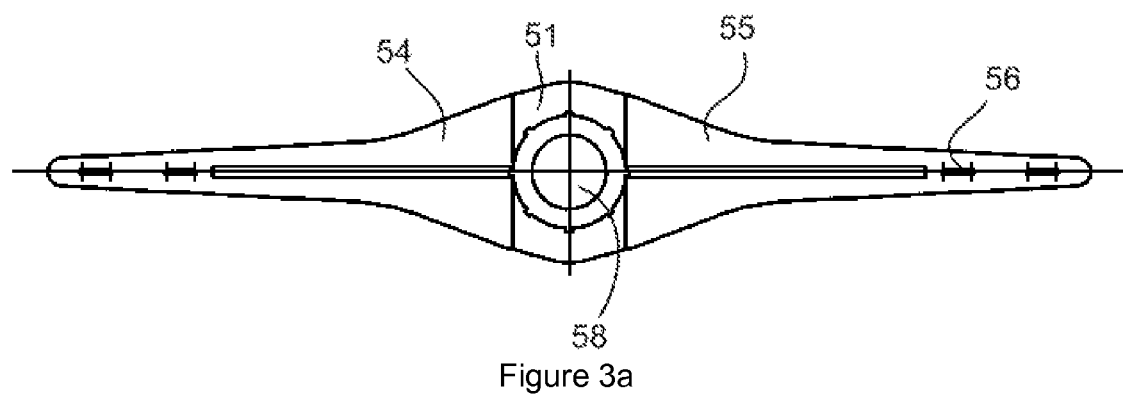
FIGS. 3a-3c illustrate an embodiment of a carrier according to the present invention.
Figure 3B:
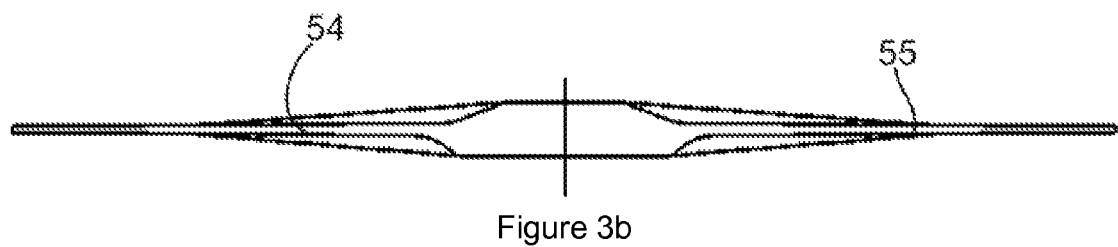
Figure 3C:
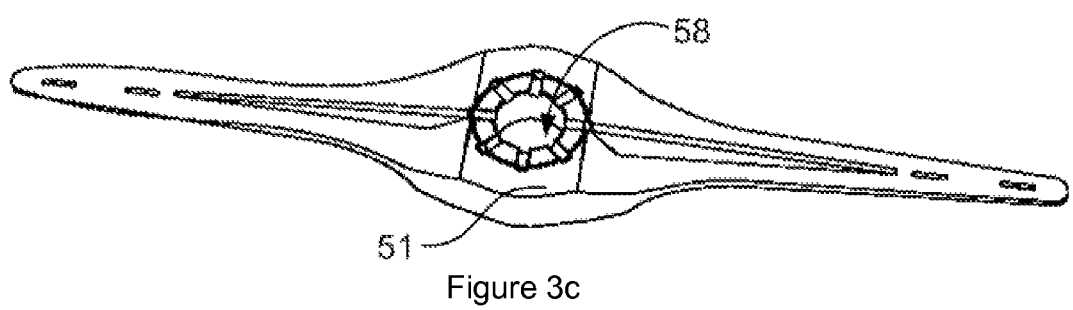

FIGS. 3a-3c illustrate an embodiment of a carrier according to the present invention. FIG. 3a shows a top view, FIG. 3b shows a side view and FIG. 3c shows an isometric view.

In this embodiment, the carrier 50 comprises two support arms 54 and 55 extending from a base part 51. Base part 51 has a through-hole 58. In this embodiment, supports arms 54 and 55 comprise holes 56 for fitting electrical insulators, so that electrical power lines may be mounted on top of either of the support arms.

Preferably, fasteners or mounts may be developed that fit in the holes 56 that are adapted to carry all kinds of alternative cables or wiring, such as e.g. optical fibres.

Figure 4A:
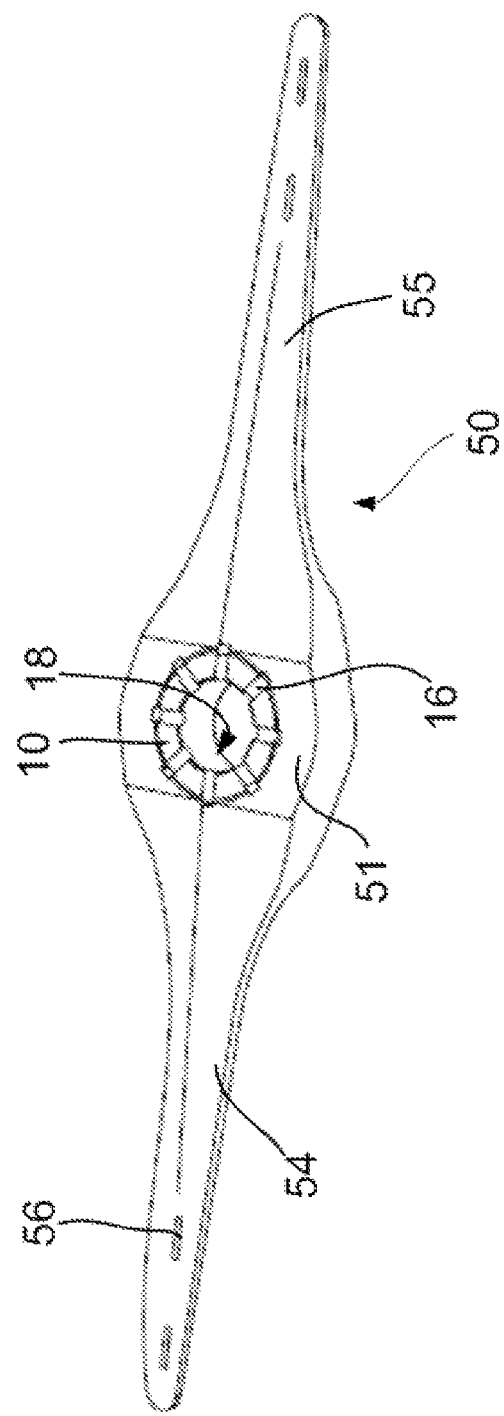
FIGS. 4a-4c illustrate an assembled kit according to an embodiment of the present invention.
Figure 4B:
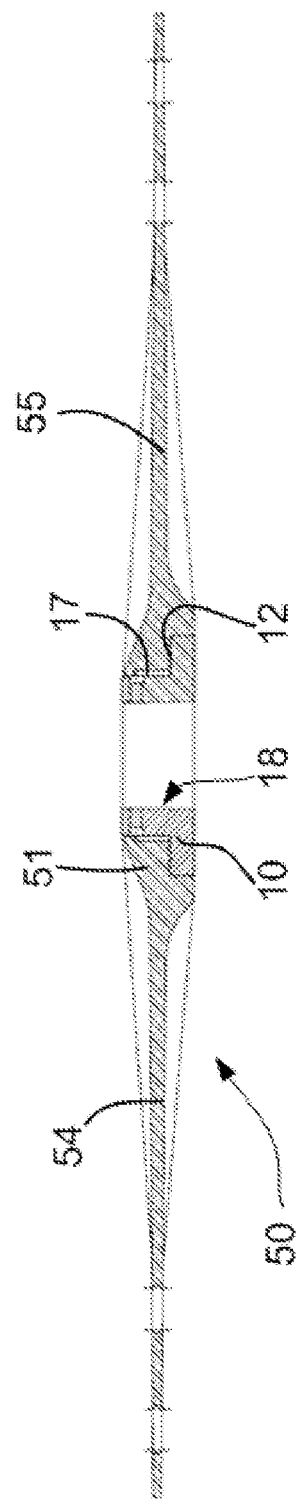
Figure 4C:
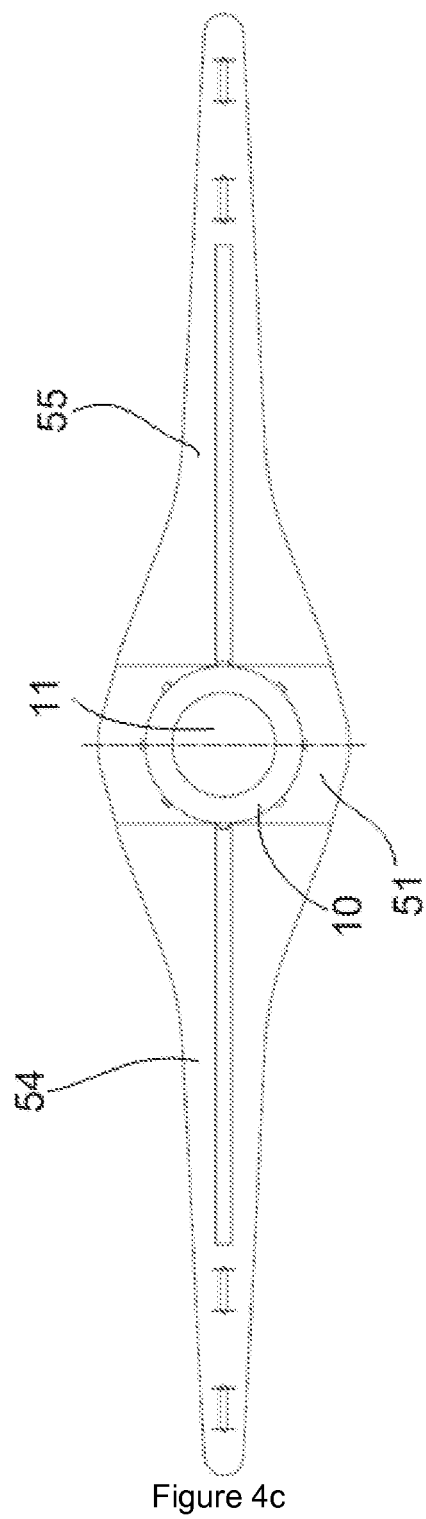

FIGS. 4a-4c illustrate an assembled kit according to an embodiment of the present invention. Base part 50 is fitted on central ring 10. FIG. 4b clearly illustrates how an internal surface of the through-hole of the carrier is adapted to be fitted around fitting surface 17 and how base part 50 is adapted to be fitted on support surface 12 of central ring 10.

The through-hole of the carrier further comprises two parts of different cross-section, such that the carrier can be fitted around annular rim 13 of the central ring 10, touching second fitting surface 15.

In the embodiment shown, the fitting surface 17 of central ring 10 comprises a plurality of protrusions 14. The internal surface of the carrier's through-hole has mating indentations, such that the carrier can be fitted in a limited number of orientations with respect to the central ring. This aspect may be useful especially when a plurality of central rings and carriers is mounted on the same pole. In order to reduce electromagnetic interference, it may be useful to use different orientations for different electrical power lines. Additionally, when different utility cables (electrical, phone, optical fibre) are mounted on the same pole, but are to be transported in different directions, the different orientations of the carriers may come in handy. It will be clear that many different sizes and shapes of protrusions and indentations may be provided to fulfil the described function.

In the embodiments shown so-far, the through-hole 11 of the central ring is tapered and has a substantially circular cross-section. Within the scope of the invention, any other cross-sectional shape may be used. An aspect of a tapered cross-section is that it may form an interlocking fit on a tapered pole. No additional fastening means would be necessary to ensure a stable connection. However, in some embodiments of the present invention, additional fasteners such as a screw or bolt may be provided to fix the central ring 10 in position with respect to the pole. To this end, fastener holes 19 may be provided (see FIG. 1). These fastener holes may be provided in embodiments with through-holes with a tapered cross-section or with a straight cross-section.

Also, in some embodiments of the invention, the through-hole of the central ring may comprise an indentation to adapt for a weld bead which may be present at the external surface of a pole.

Troughs 16 as illustrated in FIG. 4a (and also FIG. 1), may serve to guide cables or wiring to an interior of a pole. To this end, the pole should be provided with holes in appropriate locations, either during manufacture of the pole or e.g. by drilling after installation of a kit on the pole. The cables or wiring may e.g. be connected to an electrical appliance mounted on a pole, such as e.g. a security camera.

Figure 5A:
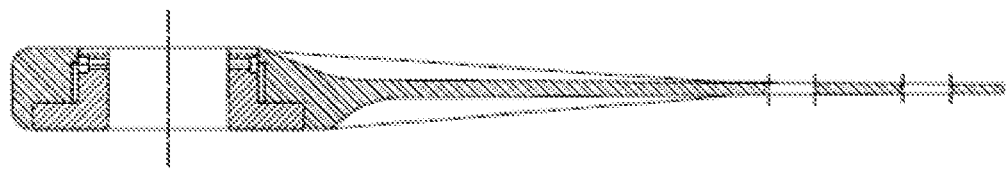
FIG. 5a-5c illustrates an alternative assembled kit according to an embodiment of the present invention.
Figure 5B:
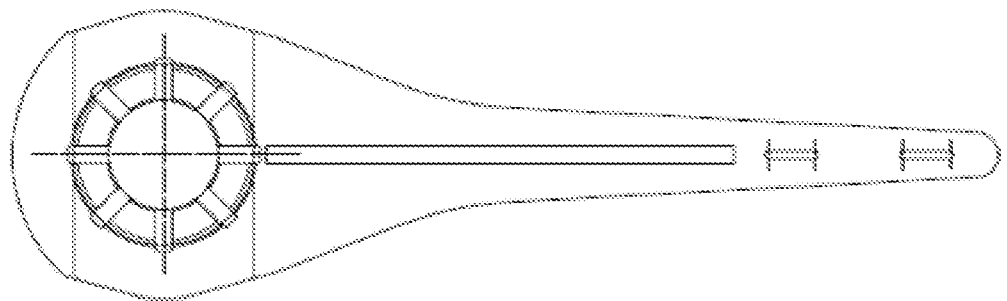
Figure 5C:
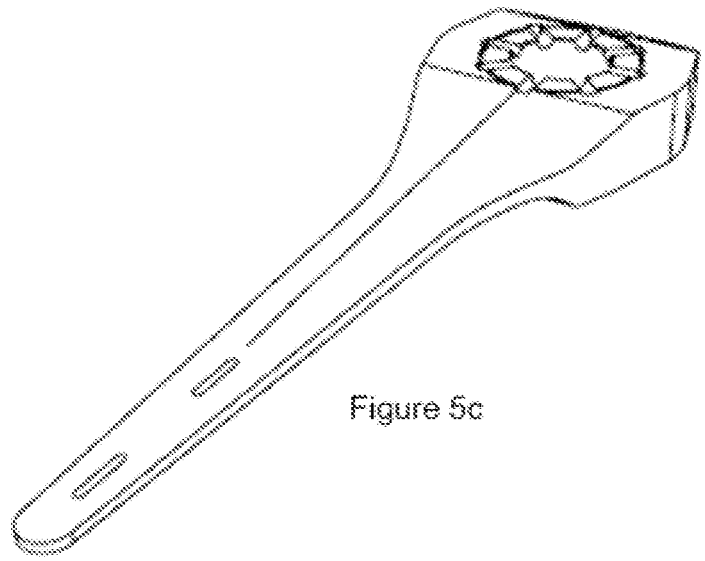

FIGS. 5a-5c illustrate an alternative assembled kit. The carrier comprises a base part and only a single support arm. In further alternative embodiments, a carrier may comprise three or four or more support arms.

Figure 6:
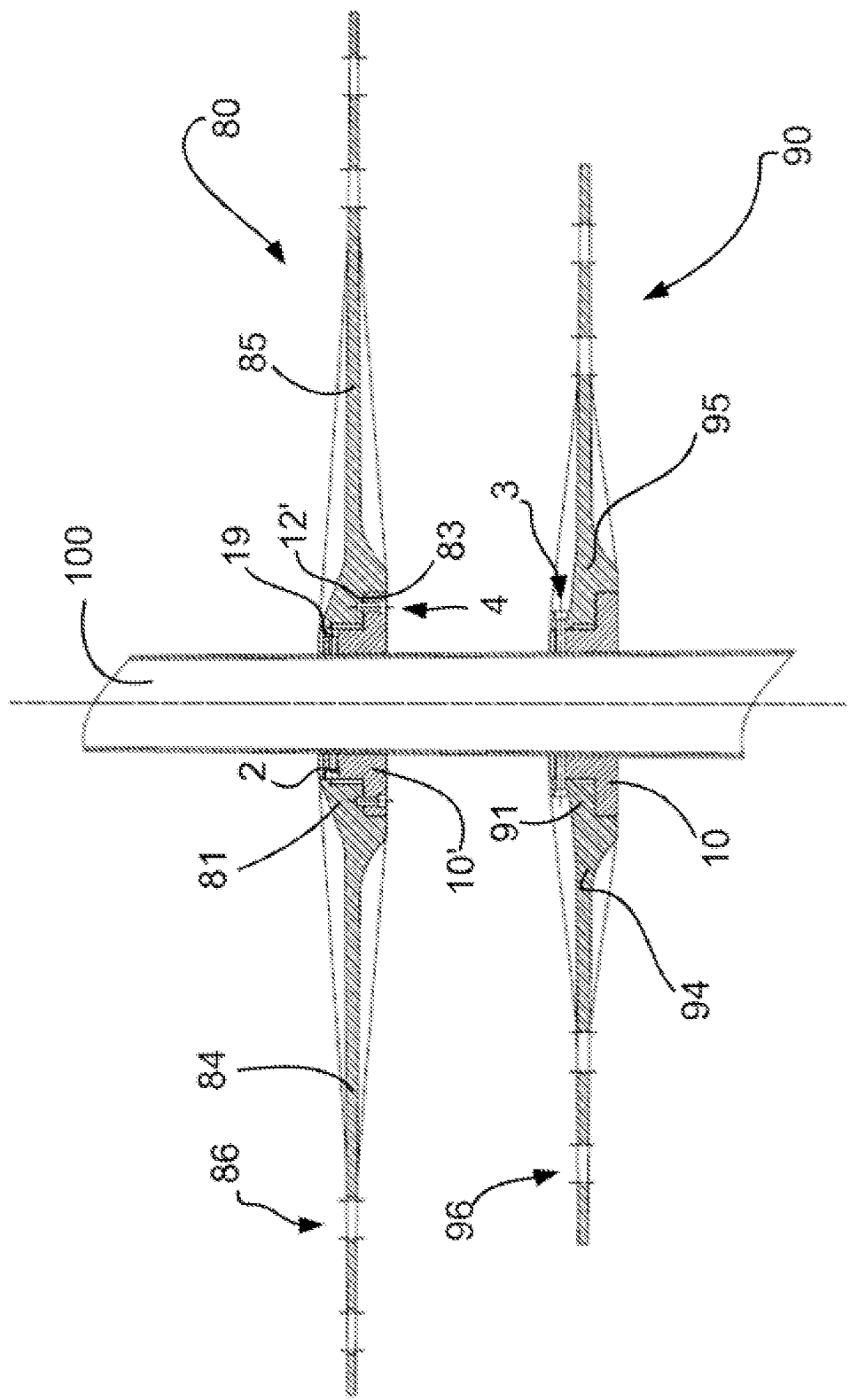
FIG. 6 illustrates alternative assembled kits according to yet other embodiments of the present invention.

FIG. 6 illustrates alternative assembled kits according to yet another embodiment of the present invention. In these kits, the carriers 80 and 90 are mounted on central rings 10' and 10 respectively. Both carriers 80 and 90 are adapted to particularly support utility lines, but the support arms 84, 85 and 94, 95 are of different lengths. In certain embodiments of the invention, the carriers need merely be placed on the central rings in order to fix them in their relative position. The through-hole of the central carrier is adapted to be fitted around the central ring's fitting surface and horizontal internal surface 83 of the carrier is supported by the central ring's support surface 12'. In alternative embodiments, it may be necessary or preferable to provide further fasteners to fix a carrier with respect to the central ring.

In FIG. 6, one or more lateral holes 19 are provided in annular ring 10' to house e.g. bolts 2 to fix the central ring with respect to the pole 100. The bolts may penetrate to the interior of the pole, of may simply exert a sufficient pressure on the external surface of the pole. Furthermore, substantially vertical holes are provided in the annular rim of central ring 10 in order to fix the carrier 80 with respect to the central ring using a suitable bolt 4.

The annular ring 10' has a slightly different arrangement for fixing the carrier 90 with respect to the central ring. The carrier comprises a lateral hole that may be aligned with the lateral hole 19 in the central ring. This way, e.g. with a single bolt 3, the carrier 90 may be fixed with respect to the central ring 10, and the central ring 10 may be fixed with respect to the pole 100.

Figure 7A:
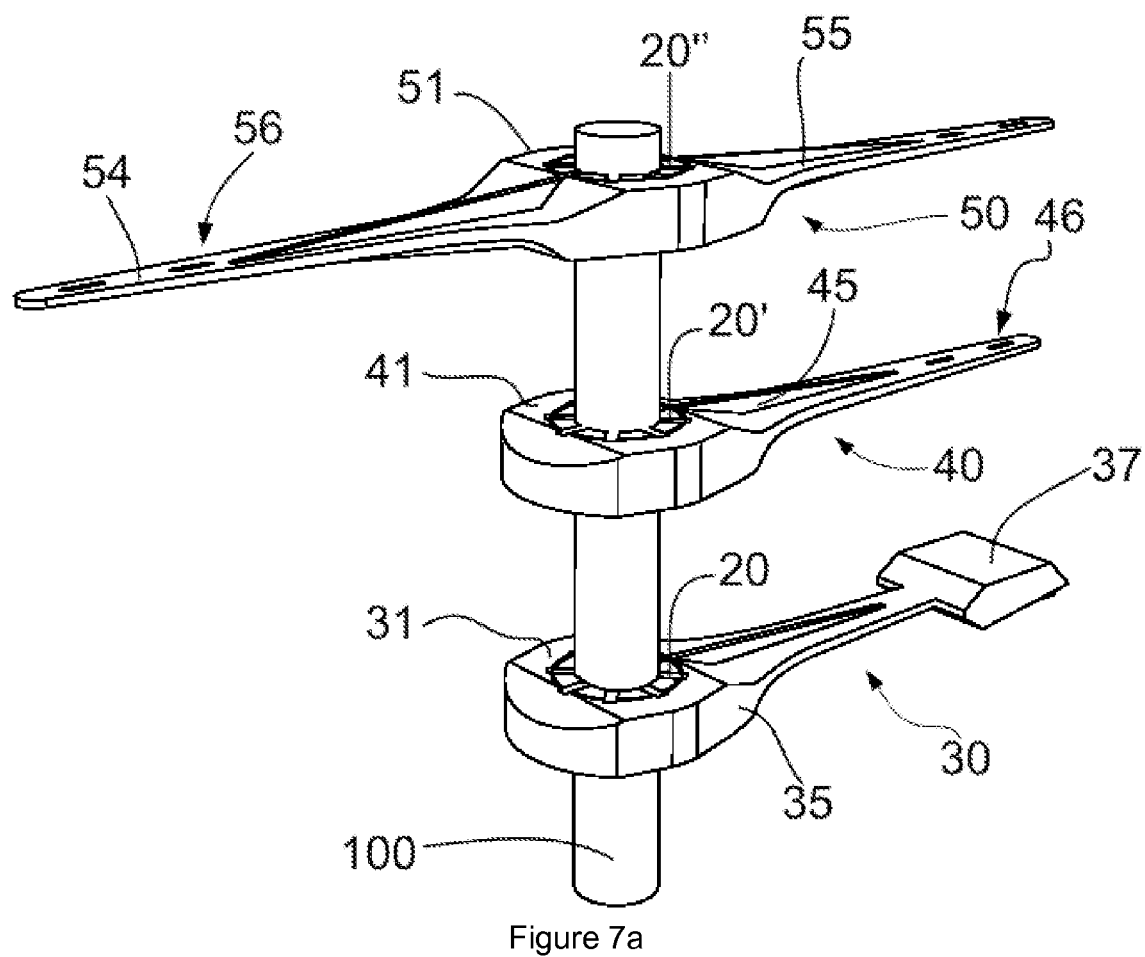
FIGS. 7a-7b illustrate a utility pole according to an embodiment of the present invention.
Figure 7B:
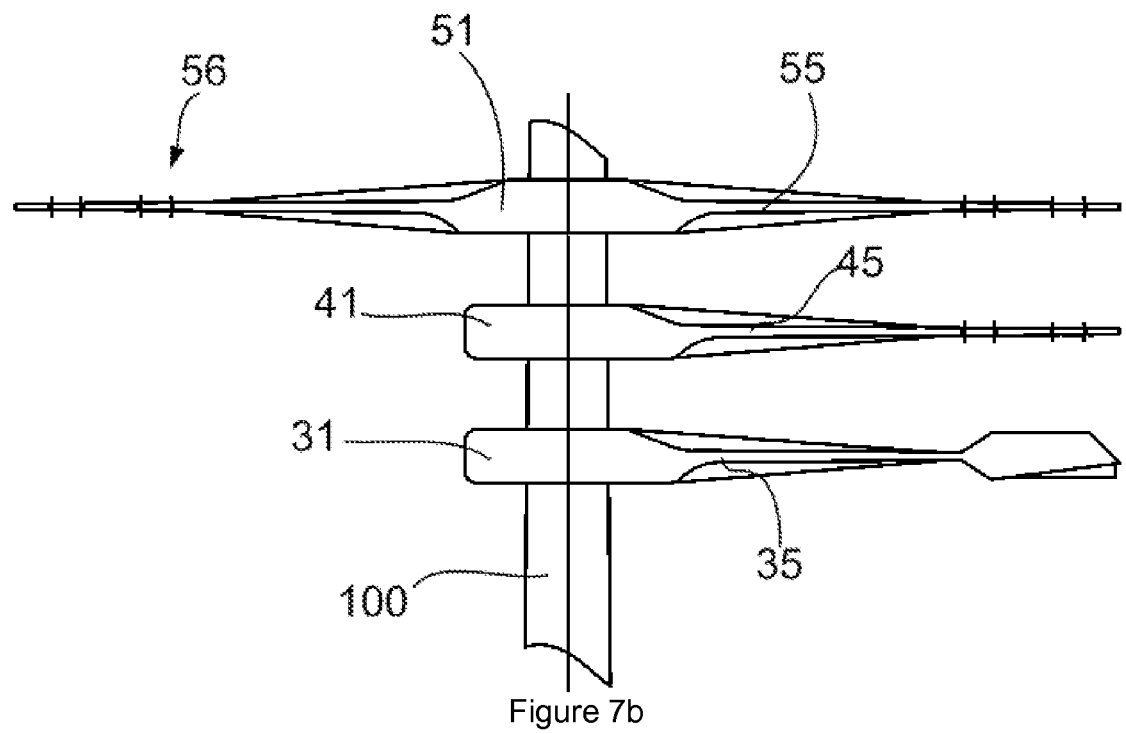

FIGS. 7a-7b illustrate a utility pole according to an embodiment of the invention. FIG. 7a shows an isometric view of the utility pole and FIG. 5b shows a side view.

A pole 100 of tapering circular cross-section is provided. At different heights along the pole, central rings 20, 20' and 20" may be mounted. In the figure, a first carrier 30 is mounted on first central ring 20, a second carrier 40 is mounted on second central ring 20', and third carrier 50 is mounted on third central ring 20". The heights at which the central rings are mounted may be determined by the size of the through-holes of the central rings. The central rings may be slid down the pole until the internal surface of the through-hole interlocks with the pole's external surface. In this case, the pole and through-holes of the central rings are of circular cross-section. The central ring with the through-hole of greatest diameter may be mounted first by sliding down the pole, followed by the central ring with a through-hole of second greatest diameter etc.

Although the central rings 20, 20' and 20" have different through-holes, their fitting surfaces 17 and support surfaces 12 are the same to a large extent. In this aspect of the invention, carrier 40 may be mounted on central ring 20', but could also be mounted on central ring 20 or central ring 20". Also the other carriers could be mounted on any of the central rings. A modular concept for a utility pole is thus provided which may be quickly and easily installed, and can also easily be adapted to different needs. A further aspect of the modular concept is that the different parts may be easily manufactured at low cost. In embodiments of the invention, the carriers do not need any fasteners to fix them with respect to the central rings (due to the interlocking fit between them), and the central rings may not need any fasteners to be fixed with respect to the pole (because of the interlocking fit of the internal surface of the tapered through-hole with the conical pole). These embodiments may thus be particularly easy to assemble.

In FIG. 7, the carriers 30, 40 and 50 have substantially the same orientation with respect to the central rings. As previously explained, the relative orientations of the carriers may be varied in accordance with circumstances.

In certain implementations, electromagnetic interference between different utilities may be a problem. This problem may be reduced by increasing the distance between the utilities and/or changing their relative orientations. One or both of these adjustments may be done relatively easily in various embodiments of the invention.

It may be seen in FIG. 7, that different utilities may be mounted on the pole. First carrier 30 comprises (or may be adapted to carry) a lamp 37 for street illumination, whereas second and third carriers 40 and 50 are adapted to carry e.g. electrical power lines, telephone lines or other.

Figure 8A:
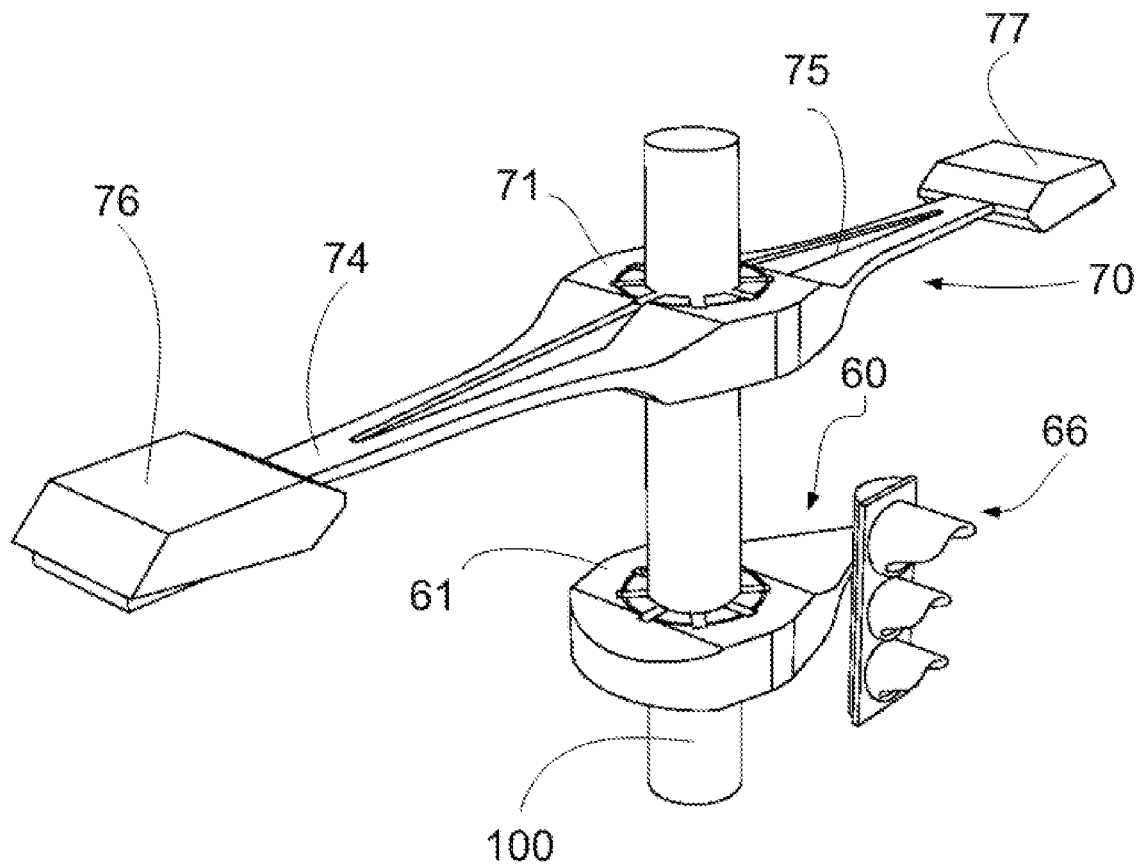
FIGS. 8a-8b illustrate an alternative utility pole according to an embodiment of the present invention.
Figure 8B:
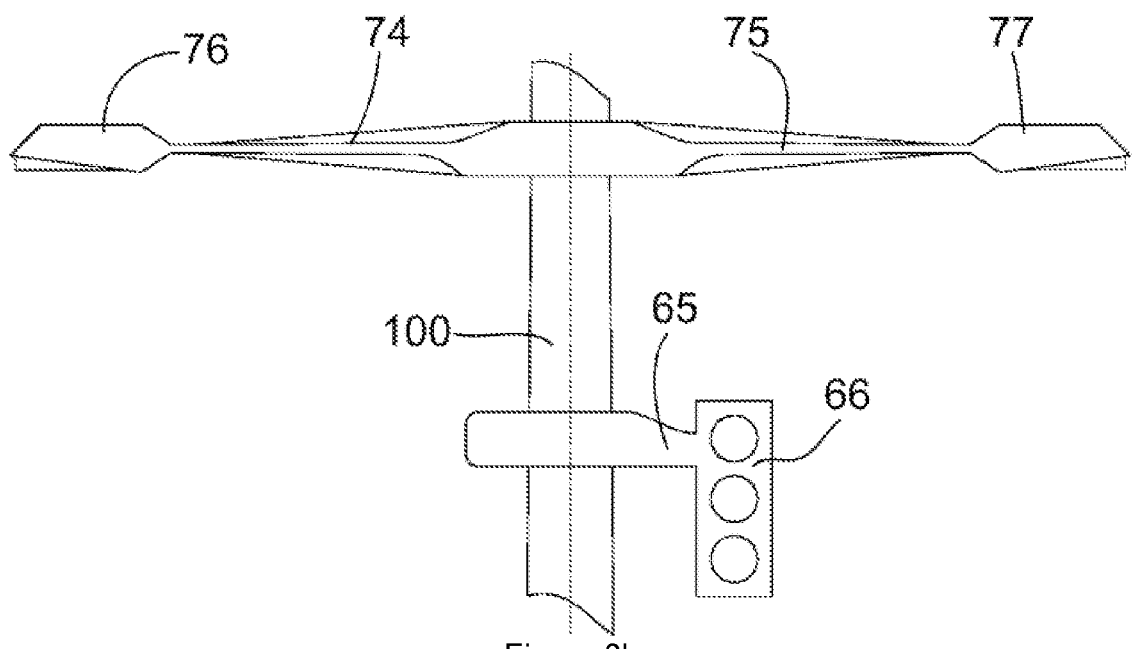

FIGS. 8a and 8b illustrate an alternative embodiment of a utility pole. A carrier 60 comprises (or is adapted to carry) a traffic light 66. A carrier 70 is provided with two supports arm 74 and 75 for carrying lamps 76 and 77. Lamps 76 and 77 may be supplied with electricity through the use of batteries or through cables running down in the pole.

Figure 9:
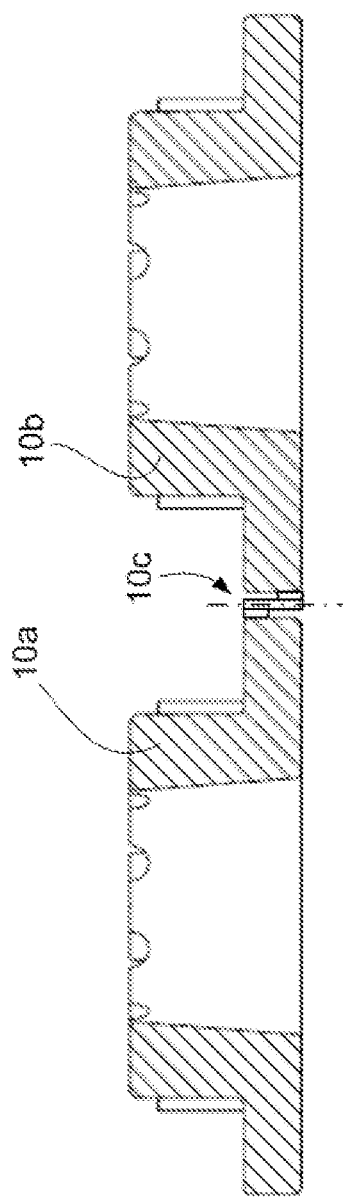
FIG. 9 illustrates a further embodiment of a central ring in accordance with the present invention.

In further alternative embodiments (see FIG. 9), the central rings may be composed of two halves 10a and 10b connected along a substantially vertical hinge 10c. The two parts 10a and 10b may thus assume an open position and a closed position. Instead of sliding down a central ring along the height of a pole, the central ring may thus be mounted by opening the ring, subsequent placement of the ring around the pole, and closing of the ring.

In other alternative embodiments, the central rings may be composed of two separate halves which may be connected with e.g. screws or bolts. To mount these central rings, the two halves are separated, positioned around the pole and subsequently connected to each other.

Figure 10:
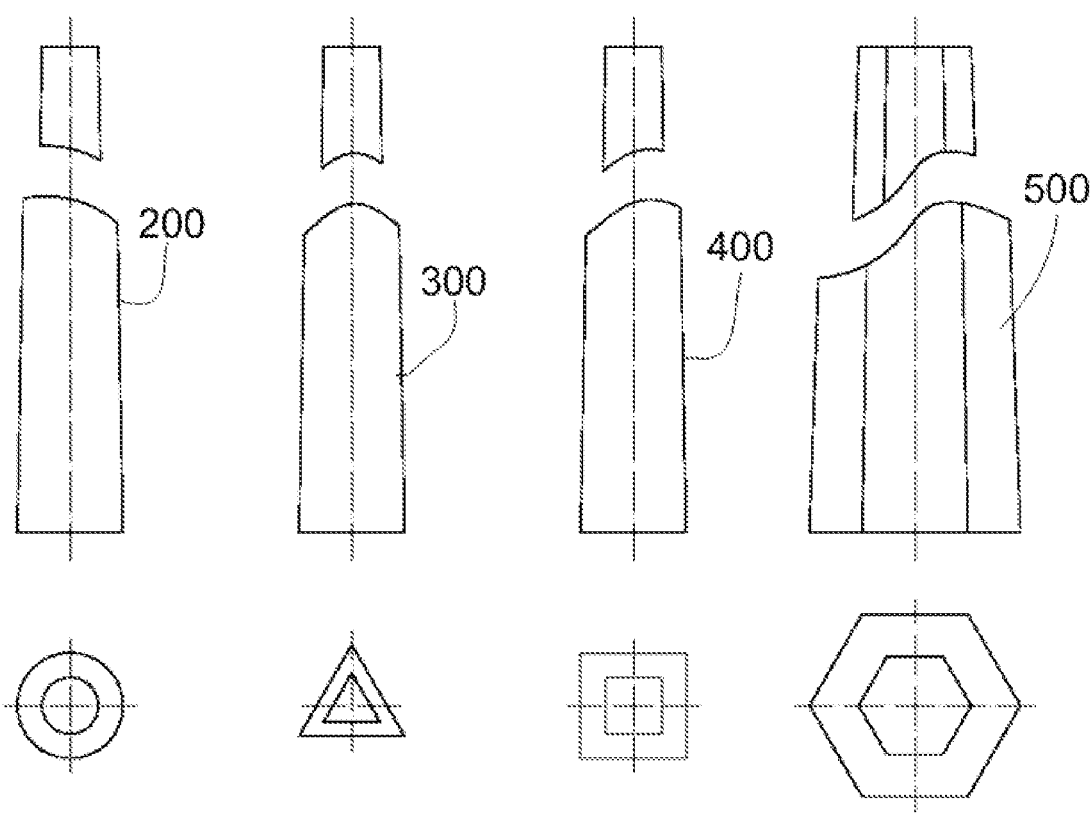
FIG. 10 illustrates some possible cross-sections of poles which may be used in embodiments of the present invention.

FIG. 10 illustrates a plurality of poles of alternative cross-sections which may be used in embodiments of the present invention. FIG. 10 illustrates poles of tapering cross-section, wherein the cross-section may be circular, triangular, square (or rectangular) and hexagonal. It will be clear however, that further alternative cross-sections are also possible, e.g. pentagonal, heptagonal etc.

An aspect of the invention is that only the through-hole of the central ring needs to be adapted to the pole upon which it is to be mounted. The carriers are merely adapted to be fitted on the support surface(s) and around the fitting surfaces of the central ring. The height of the utility pole may be varied freely, but for most of the implementations mentioned, heights between 6 meters and 12 meters may be most advantageous.

Although poles of tapering cross-section have advantages (e.g. an interlocking connection may be achieved with a tapered through-hole of a central ring), the invention may also be used with poles of cylindrical (i.e. non-tapering) cross-section. In these arrangements, usually at least one additional fastener would be needed to fix a central ring with respect to a pole. Examples of suitable fasteners were illustrated in e.g. FIG. 6. When a plurality of kits is to be mounted on a cylindrical pole, the central rings and their through-holes may all be of the same size. In accordance with circumstances, carriers may then be selected to fit on any of the central rings. In the embodiments shown, the central rings all had an annular rim, with a second fitting surface and the base part of the carrier was adapted to fit around this second fitting surface. However, it should be clear that variations are possible in the design of the central ring without affecting the advantages of the present invention. Similarly, it should be clear the design of the carriers may also be varied and is not limited to the particular embodiments shown in the figures.

Furthermore, only a limited number of all possible appliances that may be mounted on a pole has been illustrated. Non-illustrated alternative appliances include (but are not limited to): transformers, optical fibre, telephone, ADSL, Internet connection, photovoltaic systems, WiFi, low voltage and medium voltage electrical power lines, webcams, security cameras, speed cameras, traffic cameras, street lighting and non-public lamps.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described before, but should be determined only by a fair reading of the claims that follow.

The invention claimed is:

1. A kit for mounting one or more appliances on a pole, the kit comprising
a first central ring for being mounted around the pole and having a first through-hole, a first fitting surface and a first support surface,
a second central ring for being mounted around the pole and having a second through-hole, a second fitting surface and a second support surface, the second through-hole being of a different size than the first through-hole, and
wherein the first fitting surface and second fitting surface and the first support surface and the second support surface substantially correspond to each other, and,
a carrier having a base part and one or more support arms extending from said base part for supporting one or more appliances, wherein
said base part is adapted to be fitted on either of the first and second support surfaces and has a base through-hole adapted for being fitted around either of the first and second fitting surfaces, wherein the first central ring further comprises a top surface with one or more troughs to position and guide cables between an interior of the pole and the appliances.

2. A kit according to claim 1, wherein the first through-hole of the first central ring is adapted to form an interference fit with the pole.

3. A kit according to claim 2, wherein the first through-hole of the first central ring is tapered.

4. A kit according to claim 1, wherein the first and second fitting surfaces comprise one or more protrusions and the base through-hole of the carrier comprises indentations mating said protrusions.

5. A kit according to claim 4, wherein the first and second fitting surfaces comprise a plurality of equispaced identical protrusions.

6. A kit according to claim 1, wherein the carrier comprises at least two support arms extending from said base part.

7. A kit according to claim 1, wherein the first central ring comprises one or more lateral holes for fitting a fastener.

8. A kit according to claim 1, wherein one or more of the support arms comprise holes for fitting electrical insulators.

9. A kit according to claim 1, wherein one or more of the support arms comprise or are adapted to carry an illumination system.

10. A kit according to claim 1, wherein one or more of the support arms comprise or are adapted to carry a traffic light.

11. A kit according to claim 1, further comprising the pole around which the first and second central rings of the kit may be mounted.

12. A carrier suitable for being used in the kit according to claim 1.

13. A utility pole having a tapering cross-section carrying one or more of the kits according to claim 1.

14. A utility pole according to claim 13, wherein at least one of the support arms carries electrical power lines.

15. A kit according to claim 6, wherein the support arms extend substantially horizontally.

16. A utility pole carrying a kit according to claim 1, wherein
the first central ring is mounted on the utility pole at a first height, and the second central ring is mounted on the utility pole at a second height, wherein
the first carrier is mounted on the first central ring, and a second carrier is mounted on the second central ring, and wherein
the first carrier is mounted in a different orientation than the second carrier.

* * * * *